(12) United States Patent
Lam

(10) Patent No.: US 9,167,018 B2
(45) Date of Patent: Oct. 20, 2015

(54) SYSTEM AND METHOD FOR MEDIA STREAM PLAYBACK AND BUFFER MANAGEMENT

(71) Applicant: Sengital Limited, Hong Kong (HK)

(72) Inventor: Hiu Fung Lam, Hong Kong (HK)

(73) Assignee: SENGITAL LIMITED, Hong Kong (HK)

( * ) Notice: Subject to any disclaimer, the term of this patent is extended or adjusted under 35 U.S.C. 154(b) by 385 days.

(21) Appl. No.: 13/735,055

(22) Filed: Jan. 7, 2013

(65) Prior Publication Data

US 2013/0198402 A1 Aug. 1, 2013

(30) Foreign Application Priority Data

Jan. 6, 2012 (HK) .................................... 12100188

(51) Int. Cl.
- H04L 29/06 (2006.01)
- H04N 21/432 (2011.01)
- H04L 29/08 (2006.01)
- H04W 8/24 (2009.01)
- H04N 21/6373 (2011.01)
- H04N 21/647 (2011.01)
- H04N 21/44 (2011.01)
- H04N 21/442 (2011.01)

(52) U.S. Cl.
CPC .......... *H04L 65/604* (2013.01); *H04L 65/4069* (2013.01); *H04L 67/02* (2013.01); *H04N 21/4325* (2013.01); *H04N 21/44004* (2013.01); *H04N 21/44209* (2013.01); *H04N 21/6373* (2013.01); *H04N 21/64707* (2013.01); *H04W 8/245* (2013.01)

(58) Field of Classification Search
CPC ............ H04N 21/21; H04N 21/23406; H04N 21/44004; H04N 19/40; H04N 19/577; H04N 21/234; H04N 21/4325; H04N 21/44; H04N 21/44008; H04N 21/654; H04L 65/607; H04L 65/4023; H04L 65/4084; H04L 68/4069; H04L 68/4092; H04L 68/60; H04L 68/604; H04L 67/02; H04L 67/04
See application file for complete search history.

(56) References Cited

U.S. PATENT DOCUMENTS

| | | | |
|---|---|---|---|
| 6,912,224 B1 * | 6/2005 | Duault et al. .................. | 370/412 |
| 7,530,089 B1 * | 5/2009 | Hayes et al. .................... | 725/95 |
| 7,895,629 B1 * | 2/2011 | Shen et al. ....................... | 725/62 |
| 8,949,452 B2 * | 2/2015 | Harrang et al. ................ | 709/231 |
| 2005/0232597 A1 * | 10/2005 | Shimazaki et al. ............. | 386/95 |
| 2005/0271357 A1 * | 12/2005 | Adler et al. ...................... | 386/46 |
| 2006/0092282 A1 * | 5/2006 | Herley et al. ............. | 348/207.99 |
| 2006/0095472 A1 * | 5/2006 | Krikorian et al. ........... | 707/104.1 |
| 2007/0127881 A1 * | 6/2007 | Iwamura .......................... | 386/68 |
| 2010/0281142 A1 * | 11/2010 | Stoyanov ........................ | 709/221 |
| 2011/0023080 A1 * | 1/2011 | Drang et al. ................... | 725/148 |
| 2011/0302238 A1 * | 12/2011 | Sood et al. ...................... | 709/203 |

* cited by examiner

*Primary Examiner* — Ramy M Osman

(57) ABSTRACT

A media stream playback and buffer management system includes: a server; a wireless router being connected with the server through a network cable; at least a media stream receiver being connected to the wireless router through a network cable, including a buffer, and configured to download media stream frames from the server at a time varying download rate, to buffer the downloaded frames with the buffer, and to play the buffered content at a constant display frame rate; and at least a mobile terminal being configured to wirelessly communicate with the wireless router and remotely control the media stream receiver. The media stream receiver is configured to determine when to play or to buffer the downloaded content based on the download rate and the display frame rate. A method for media stream playback and buffer management is also provided.

20 Claims, 8 Drawing Sheets

SYSTEM AND METHOD FOR MEDIA STREAM PLAYBACK AND BUFFER MANAGEMENT

CROSS-REFERENCE TO RELATED APPLICATIONS

This application claims the benefit of Hong Kong short term patent application No. 12100188.8 filed on Jan. 6, 2012; the contents of which is hereby incorporated by reference.

FIELD OF THE PATENT APPLICATION

The present patent application generally relates to information management technologies and more specifically to a system and a method for media stream playback and buffer management that offers a smoother download and playback user experience for media streams.

BACKGROUND

In current IPTV, media box, or stick applications, a user typically sees a loading bar indicating the progress of the ongoing media stream download and needs to wait for some time for the media content to be downloaded before media content can be played. However, it is often desired to provide video or other media stream content to the user more smoothly and to improve the user experience of media stream download and playback.

SUMMARY

The present patent application is directed to a system and a method for media stream playback and buffer management. In one aspect, the present patent application provides a media stream playback and buffer management system including: a server; a wireless router being connected with the server through a network cable; at least a media stream receiver being connected to the wireless router through a network cable, including a buffer, and configured to download media stream frames from the server at a time varying download rate, to buffer the downloaded frames with the buffer, and to play the buffered content at a constant display frame rate; and at least a mobile terminal being configured to wirelessly communicate with the wireless router and remotely control the media stream receiver. The media stream receiver is configured to determine when to play or to buffer the downloaded content based on the download rate and the display frame rate.

The media stream receiver may include a central processing unit, a memory, a wireless communication module, a display, and a RF interface module. The memory, the wireless communication module, the display, and the RF interface module are electrically connected with the central processing unit.

The media stream receiver may be configured to start to play the buffered content when the download rate is one half of the display frame rate, if the download rate eventually increases to be greater than the display frame rate.

The media stream receiver may be configured to start to play the buffered content when the download rate is equal to the display frame rate, if the download rate eventually increases to be equal to the display frame rate.

The media stream receiver may be configured to set a predetermined maximum download time and to start to play the buffered content from the predetermined maximum download time, if the download rate eventually increases to be less than the display frame rate.

The media stream receiver may be configured to play the buffered content and to store recently downloaded frames into the buffer, if the download rate is greater than or equal to the display frame rate.

The media stream receiver may be configured to check whether there is space available in the buffer to buffer more frames with, if the download rate is greater than the display frame rate.

The media stream receiver may be configured to play the buffered content when the number of frames stored in the buffer is greater than zero, if the download rate is less than the display frame rate.

The media stream receiver may be configured to stop playing the buffered content and to buffer recently downloaded frames, when the number of frames stored in the buffer is equal to zero.

The media stream receiver may be configured to resume playing the buffered content, when the number of frames stored in the buffer is greater than a predetermined threshold.

In another aspect, the present patent application provides a method for media stream playback and buffer management including: downloading media stream frames at a time varying download rate from a server; buffering the downloaded frames with a buffer; playing the buffered content at a constant display frame rate; and determining when to play or to buffer the downloaded content based on the download rate and the display frame rate in real time.

The method may further include starting to play the buffered content when the download rate is one half of the display frame rate, if the download rate eventually increases to be greater than the display frame rate.

The method may further include starting to play the buffered content when the download rate is equal to the display frame rate, if the download rate eventually increases to be equal to the display frame rate.

The method may further include setting a predetermined maximum download time and starting to play the buffered content from the predetermined maximum download time, if the download rate eventually increases to be less than the display frame rate.

The method may further include playing the buffered content and storing recently downloaded frames into the buffer, if the download rate is greater than or equal to the display frame rate.

The method may further include checking whether there is space available in the buffer to buffer more frames with, if the download rate is greater than the display frame rate.

The method may further include playing the buffered content when the number of frames stored in the buffer is greater than zero, if the download rate is less than the display frame rate.

The method may further include stopping playing the buffered content and to buffer recently downloaded frames, when the number of frames stored in the buffer is equal to zero.

The method may further include resuming playing the buffered content, when the number of frames stored in the buffer is greater than a predetermined threshold.

In yet another aspect, the present patent application provides a media stream playback and buffer management system including: a server; and at least a media stream receiver being connected to the server, including a buffer, and configured to download media stream frames from the server at a time varying download rate, to buffer the downloaded frames with the buffer, and to play the buffered content at a constant display frame rate. The media stream receiver is configured to determine when to play or to buffer the downloaded content based on the relationship between the download rate and the display frame rate in real time.

BRIEF DESCRIPTIONS OF THE DRAWINGS

DETAILED DESCRIPTION

Reference will now be made in detail to a preferred embodiment of the system and the method for media stream playback and buffer management disclosed in the present patent application, examples of which are also provided in the following description. Exemplary embodiments of the system and the method for media stream playback and buffer management disclosed in the present patent application are described in detail, although it will be apparent to those skilled in the relevant art that some features that are not particularly important to an understanding of the system and the method for media stream playback and buffer management may not be shown for the sake of clarity.

Furthermore, it should be understood that the system and the method for media stream playback and buffer management disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
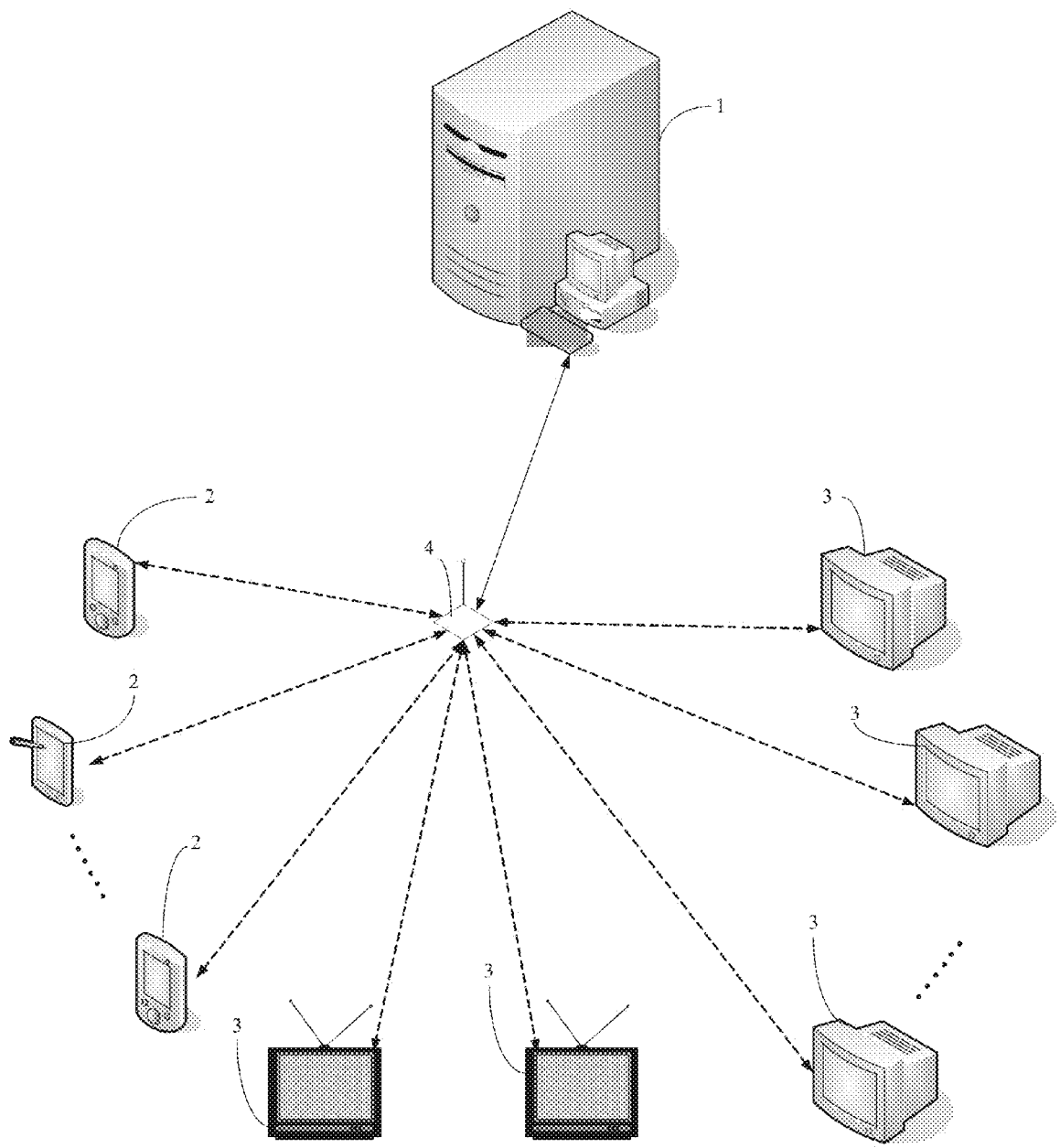
FIG. 1 is a diagram illustrating the architecture of a media stream playback and buffer management system according to an embodiment of the present patent application.

Referring to FIG. 1, a media stream playback and buffer management system according to an embodiment of the present patent application includes a plurality of smart mobile terminals 2, a plurality of network TVs 3, and a server 1. The smart mobile terminals 2 are configured to communicate with the server 1 wirelessly. In this embodiment, the server 1 is connected with a wireless router 4 through a network cable, and the server 1 is configured to communicate wirelessly with the smart mobile terminals 2 through the wireless router 4. There may be one or multiple smart mobile terminals 2. The smart mobile terminals 2 may be personal digital assistants (PDAs), smart phones, smart tablets, and etc. The server 1 is a cloud server or any other type of server that has the capability of processing massive data. The server 1 may be one individual server, or a server unit that is composed by a plurality of individual servers. The wireless communication between the wireless router 4 and the smart mobile terminals 2 may be based on Wi-Fi, Zigbee, BT, BLE, RF4CE, 2.46 GHz RF, and other wireless communication standards.

In this embodiment, there may be one or more network TVs 3, depending on the actual design and application requirements. The network TVs 3 are TVs that are capable of communicating with a network, and the network TVs 3 are configured to communicate with the server 1 through wired communication. Referring to FIG. 1, the network TVs 3 are configured to communicate with the server 1 through the wireless router 4. The network TVs 3 are connected to the wireless router 4 through network cables. The smart mobile terminals 2 are configured to remotely control the network TVs 3.

Figure 2:
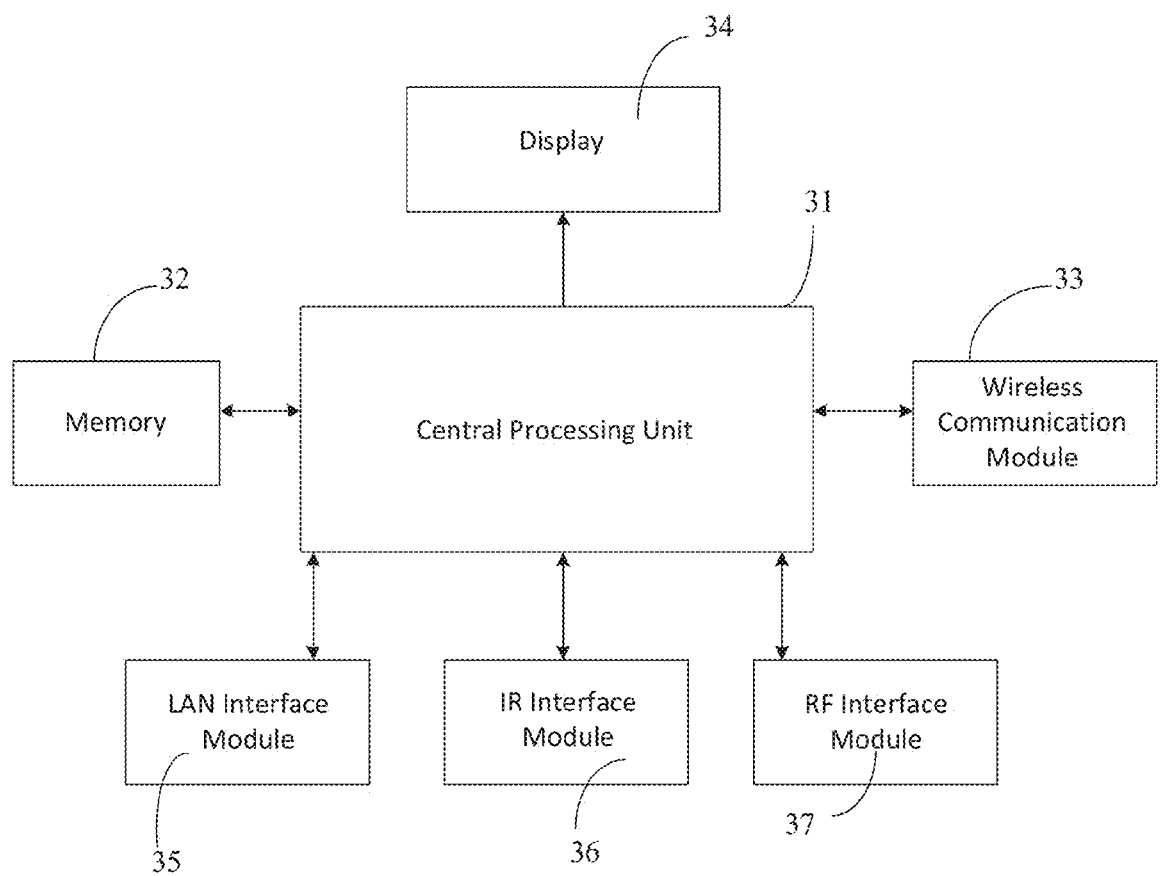
FIG. 2 is a block diagram of a media stream receiver such as a network TV in the media stream playback and buffer management system depicted in FIG. 1.

Referring to FIG. 2, each of the network TVs 3 in the above embodiment includes a central processing unit 31, a memory 32, a wireless communication module 33, a display 34, a LAN interface module 35, an IR interface module 36, and a RF interface module 37. The memory 32, the wireless communication module 33, the display 34, the LAN interface module 35, the IR interface module 36, and the RF interface module 37 are electrically connected with the central processing unit 31. The central processing unit 31 is the center of the network TV for processing data. The memory 32 is configured to store different control commands, preset commands, and program names. It is understood that in this embodiment the memory 32 is configured to function as a buffer. The wireless communication module 33 is configured to enable wireless communication for the network TV 3. The LAN interface module 35 is configured to enable wired communication for network TV 3 by working with the network cables in the LAN. The IR interface module is configured to enable the smart mobile terminals 2 to control the network TV 3 through IR rays. The RF interface module 37 is configured to enable RF communication for the network TV 3. It is understood that the content that the network TV receives may be TV programs, movies, electronic books, music, radio shows and etc.

The network TV 3 is configured to play the part of a media stream that has been downloaded while showing the status of buffering of the media stream. As a result, the user does not need to wait till the end of the download to watch the content. Instead, the user can watch the program while waiting for the ongoing download. After a portion of the program is downloaded to the buffer, that portion of the program can be played. The network TV 3 is configured to initiate the control of the content being buffered so as to prepare to play the content (also referred to as the initial stage hereafter). After the buffered content is being played, the network TV 3 is configured to control and manage the content being continuously downloaded so as to determine when to play or to buffer the downloaded content (also referred to as the continuous streaming stage).

It is understood that in the above embodiments and the embodiments described hereafter, the network TV 3 may be substituted by a media box, a stick, or some other type of media stream receiver.

Figure 3:
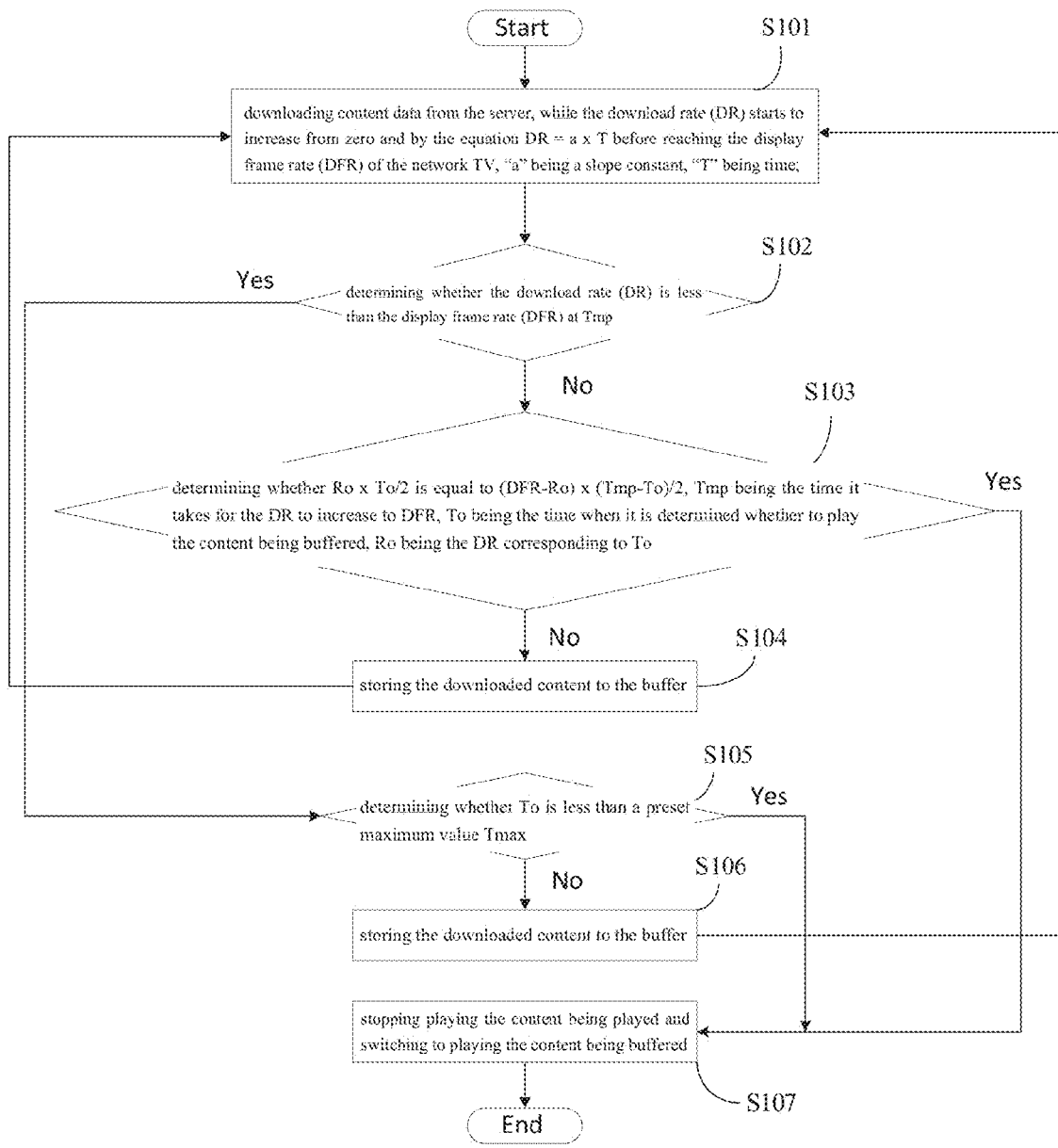
FIG. 3 is a flow chart illustrating the initial stage of a method for media stream playback and buffer management according to another embodiment of the present patent application.

Referring to FIG. 3, in a method for media stream playback and buffer management according to another embodiment of the present patent application, a process for initiating the control of the content being buffered in the initial stage includes:

S101: The network TV 3 starts to download content data from the server 1, wherein the download rate (DR) starts to increase from zero and by the equation DR=a×T before reaching the display frame rate (DFR) of the network TV 3, "a" being a slope constant, and "T" being time;

S102: During downloading the content, the network TV 3 determines whether the download rate (DR) is less than the display frame rate (DFR); if yes, goes to the step S105; if no, goes to the step S103;

S103: The network TV 3 determines whether Ro×To/2 is equal to (DFR−Ro)×(Tmp−To)/2, Tmp being the time it takes for the DR to increase to DFR, To being the time when it is determined whether to play the content being buffered, Ro being the DR corresponding to To; if yes, goes to the step S107; if no, goes to S104;

S104: The network TV 3 stores the downloaded content to the buffer and goes to the step S101;

S105: The network TV determines whether To is less than a preset maximum value Tmax; if yes, goes to the step S107; if no, goes to the step S106;

S106: The network TV 3 stores the downloaded content to the buffer and goes to the step S101; and S107: The network TV 3 stops playing the content being played and switches to playing the content being buffered.

Figure 4:
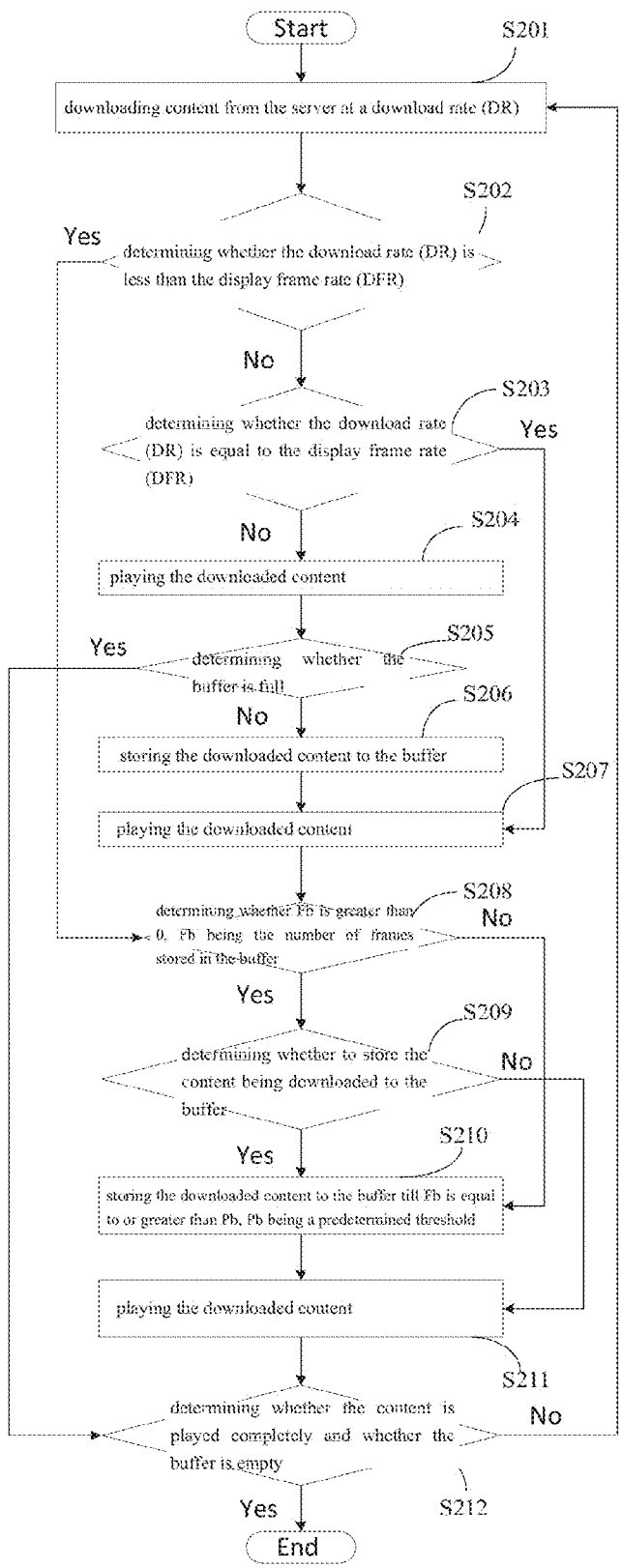
FIG. 4 is a flow chart illustrating the continuous streaming stage of a method for media stream playback and buffer management according to another embodiment of the present patent application.

Referring to FIG. 4, in a method for media stream playback and buffer management according to another embodiment of the present patent application, a process for controlling and managing the content being continuously downloaded (the continuous streaming stage) includes:

S201: The network TV 3 downloads content from the server 1 at a download rate (DR);

S202: The network TV 3 determines whether the download rate (DR) is less than the display frame rate (DFR); if yes, goes to the step S208; if no, goes to the step S203;

S203: The network TV 3 determines whether the download rate (DR) is equal to the display frame rate (DFR); if yes, goes to the step S207; if no, goes to the step S204;

S204: The network TV 3 plays the downloaded content;

S205: The network TV 3 determines whether the buffer is full; if yes, goes to the step S212; if no, goes to the step S206;

S206: The network TV 3 stores the downloaded content to the buffer;

S207: The network TV 3 plays the downloaded content;

S208: The network TV 3 determines whether Fb is greater than 0, Fb being the number of frames stored in the buffer; if yes, goes to the step S209; if no, goes to the step S210;

S209: The network TV 3 determines whether to store the content being downloaded to the buffer; if yes, goes to the step S210; if no, goes to the step S211;

S210: The network TV 3 stores the downloaded content to the buffer till Fb is equal to or greater than Pb, Pb being a predetermined threshold for number of frames stored in the buffer, and then goes to the step S212;

S211: The network TV 3 plays the downloaded content;

S212: The network TV 3 determines whether the content is played completely and whether the buffer is empty; if yes, ends the process; if no, goes to the step S201.

In the above embodiments, the media content is being downloaded at the background while the Network TV is still showing the existing content. The methods offer a calculation to find the optimal buffering time. Once the buffered content is sufficient to compensate the download flame rate so as to match the display flame rate, the Network TV can start playing the content without further waiting for the download.

Figure 5:
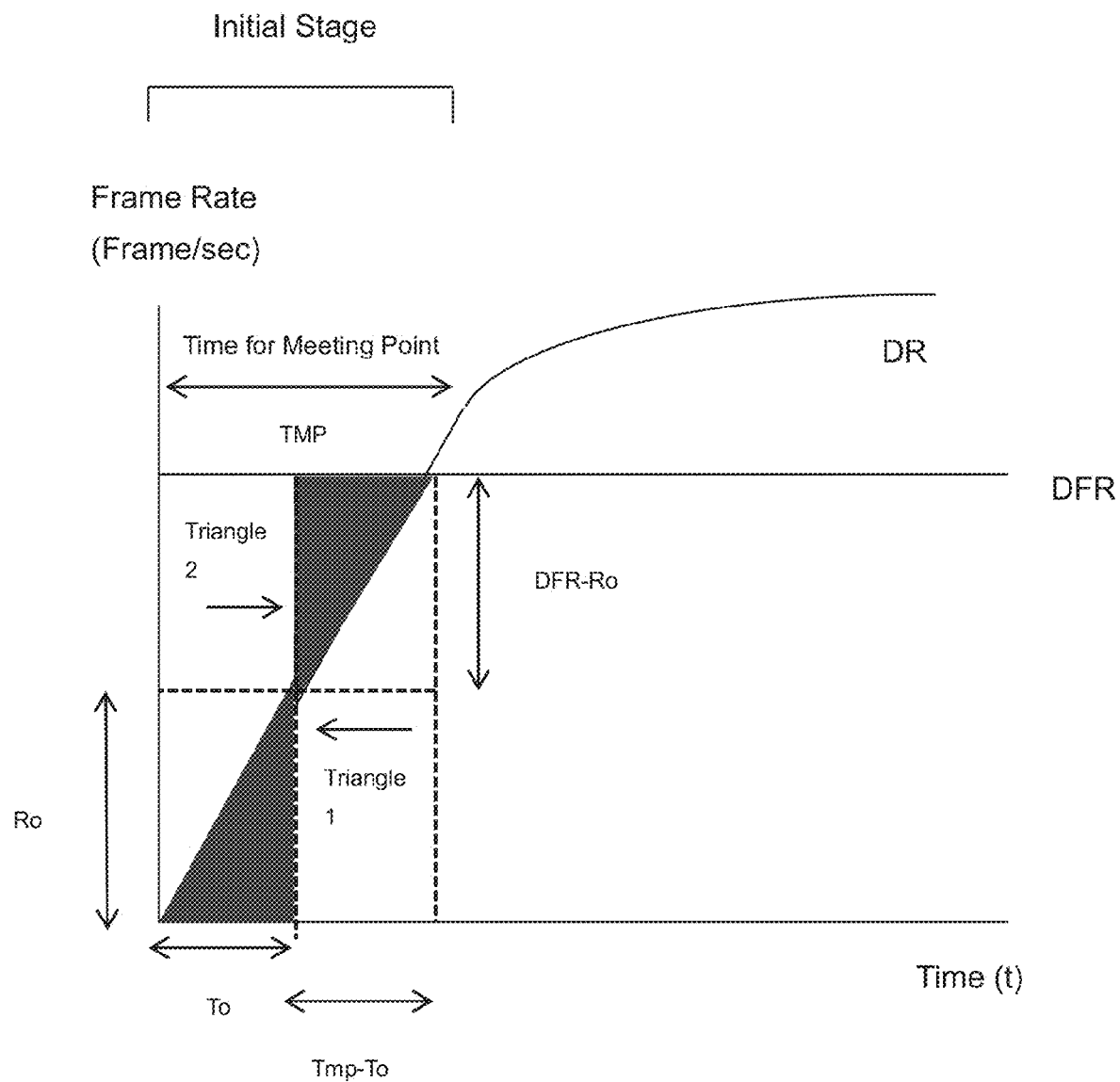
FIG. 5 illustrates a case wherein the DR (download rate) keeps increasing over time.

FIG. 5 illustrates a case wherein the DR (download rate) keeps increasing over time. Referring to FIG. 5, the DR increases linearly from zero to the meeting point (Tmp) where DR=DFR at Tmp, then the DR keeps increasing exponentially (DR>DFR) to the maximum download speed and finally keeps steady (DR=maximum download speed). The DR increases from zero when t=0 and reaches DFR when t=Tmp, in the amount of time TMP. The period of TMP is the initial stage in which the control of the content being buffered is initiated. After t=Tmp, the DR is greater than the DFR. During the period TMP, there is a time point To, which is the time determined for the buffered content to start to be played. Ro is the DR corresponding to the To. As the DR increases linearly with time during the period of TMP, when Ro×To/2 is equal to (DFR−Ro)×(Tmp−To)/2, i.e. when the area of the triangle 1 is equal to the area of the triangle 2, the number of frames having been buffered is equal to the number of frames being missing and it is the time to stop playing the content being played and to switch to playing the buffered content. Thus, the optimal buffering time To and optimal buffering rate Ro that provide the sufficient number of buffered frames in initial stage can be found in the following condition:

$$Ro \times To/2 = [(DFR-Ro) \times (tmp-to)]/2$$

Hence, assuming the DR is linear in the initial stage, the To can be found when DR=DFR/2=Ro. As DFR is known for the network TV setting, the Network TV can start playing the streaming content when DR=DFR/2. This case is reflected in the step S103 (FIG. 3).

Figure 6:
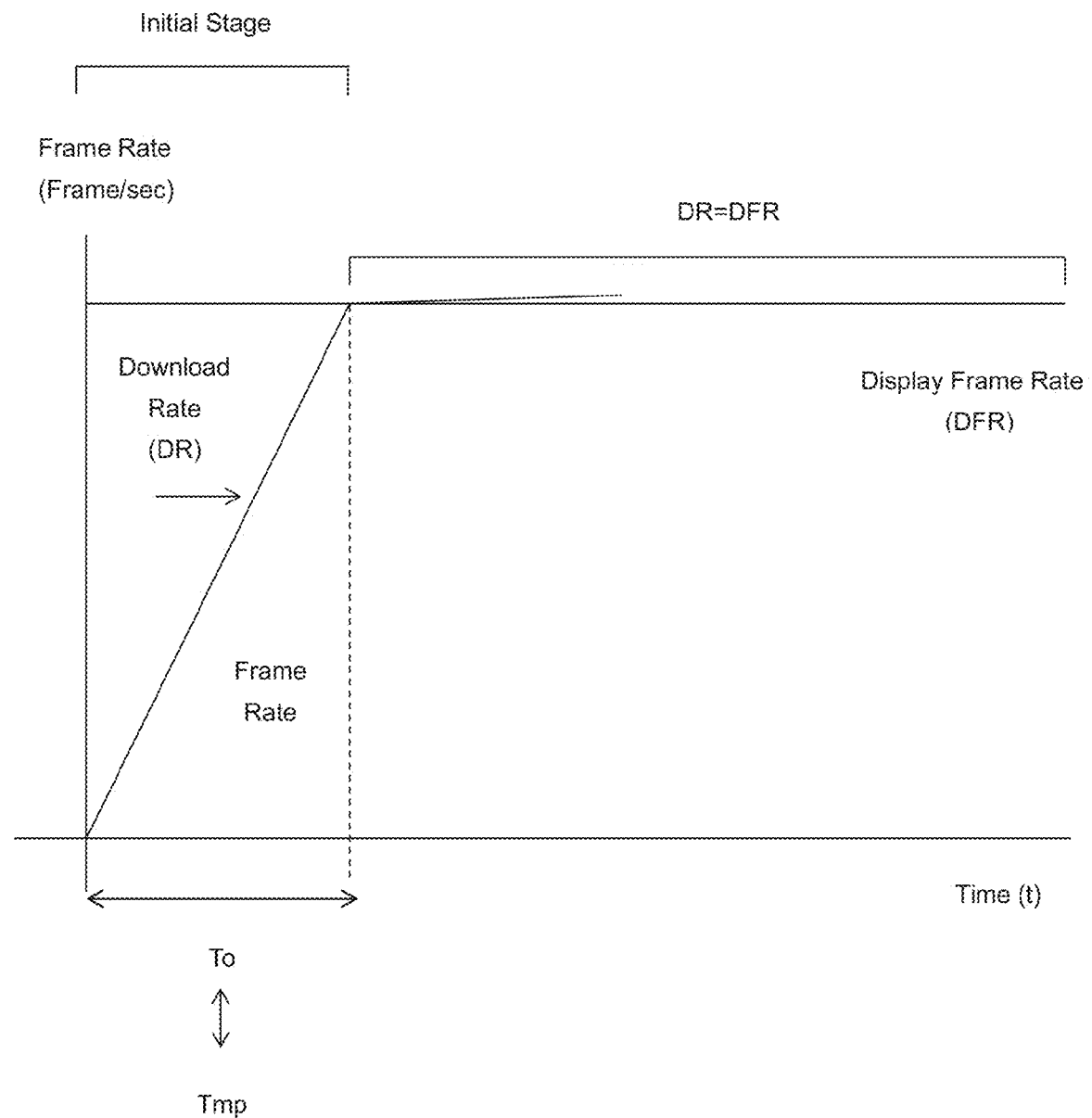
FIG. 6 illustrates another case wherein the DR keeps being equal to the DFR after increasing from zero to being equal to the DFR.

FIG. 6 illustrates another case wherein the DR keeps being equal to the DFR (a constant) after increasing from zero to being equal to the DFR. Only after the point when the DR increases to be equal to the DFR, it is the time to stop playing the content being played and to switch to playing the buffered content. In other words, the To is equal to the Tmp in this case and there is no extra buffer to be stored.

Figure 7:
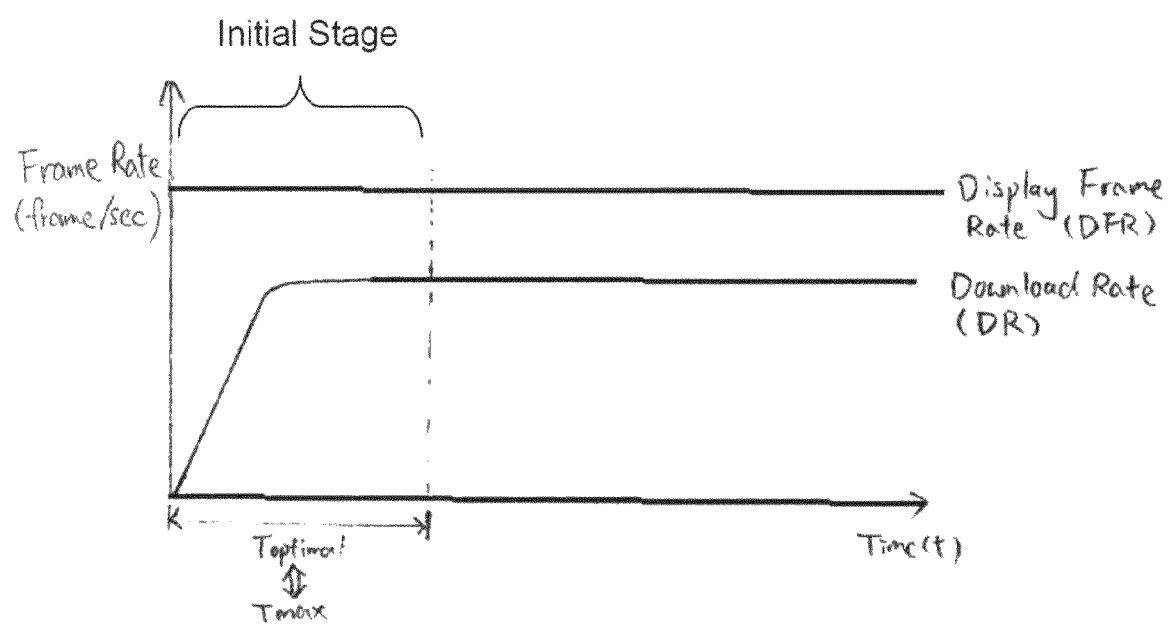
FIG. 7 illustrates another case wherein the DR increases linearly from zero to the maximum DR and stays as a constant, while the maximum DR is less than the DFR.

FIG. 7 illustrates another case wherein the DR increases linearly from zero to the maximum download rate and stays as a constant. However, in this case, the maximum DR is less than the DFR so that the DR is always less than DFR (DR<DFR). This means that the download speed cannot always support to display sufficient frames in the Network TV. In this case, the network TV is configured to set a limit for the maximum download time with the default setting, and to start to play the buffered content from the predetermined maximum download time. This case is reflected in the step S105 (FIG. 3).

Figure 8:
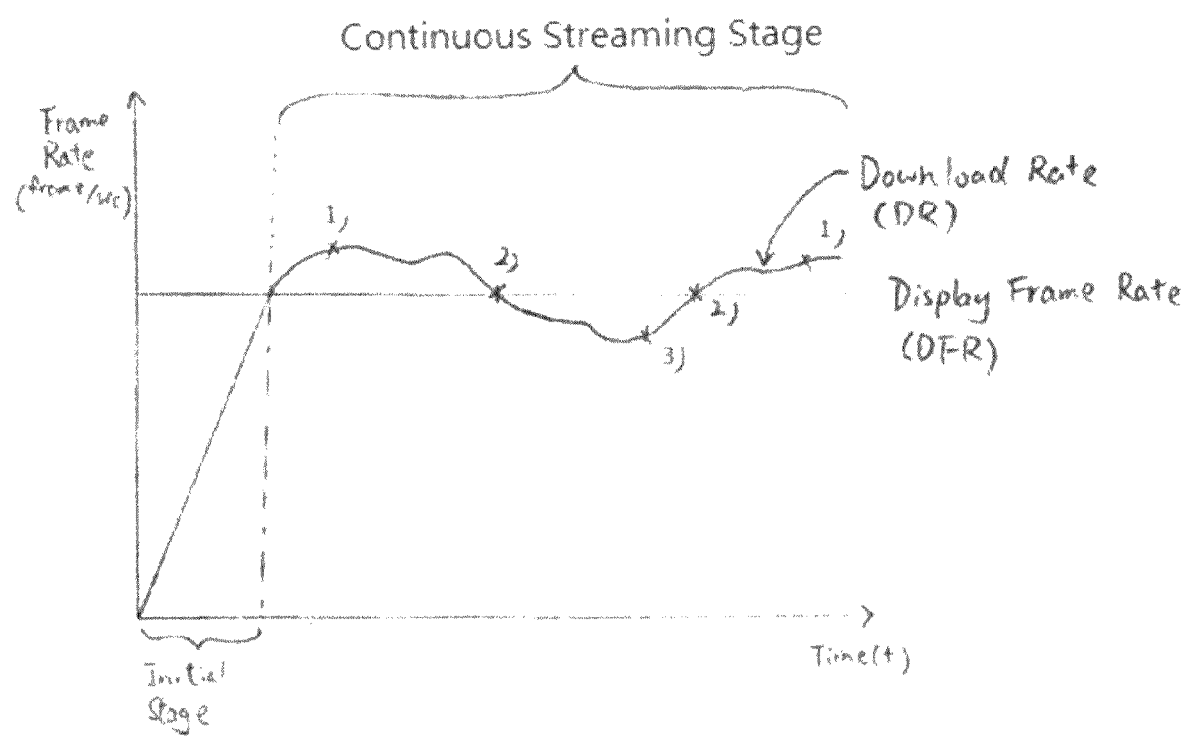
FIG. 8 illustrates the download rate (DR) over time in the continuous streaming stage in three cases.

In the period after the initial stage of the media streaming, which is also referred to as the continuous streaming stage, the DR may vary by different network conditions. There are three cases that may happen, which are illustrated by FIG. 8:

Case 1: in this case DR>DFR, the network TV 3 is configured to play the buffered content and to store the recently downloaded frames into the buffer. Thus the extra frames will keep being downloaded to the buffer until the number of fames in the buffer reach to the maximum capacity of the buffer. This case is reflected in the step S204 (FIG. 4).

Case 2: in this case DR=DFR, the network TV 3 is configured to play the content and store the recently downloaded frames into the buffer but there is no extra buffer frame. This case is reflected in the step S207 (FIG. 4).

Case 3: in this case DR<DFR, the network TV 3 is configured to play the content from the buffer when Fb>0, Fb being the number of frames stored in the buffer. When Fb=0, the network TV 3 is configured to stop playing the buffered content and keep buffering recently downloaded frames. When Fb is greater than or equal to Pb, Pb being a predetermined threshold for number of frames stored in the buffer, the network TV 3 is configured to resume playing the buffered content. This case is reflected in the step S208 (FIG. 4).

In above embodiments, the smart buffering management provide the optimization of the loading time and present the streaming content in a more user friendly way. The software running in the network TV can control what to display in the network TV. The network TV keeps displaying the existing content while the new content is being downloaded at the background. The download indicator (just a small icon) shows the loading status while the main network TV screen will show the existing content and download/buffer the new content in parallel. As a result, the network TV plays the streaming content in a smoother and more user-friendly fashion.

While the present patent application has been shown and described with particular references to a number of embodiments thereof, it should be noted that various other changes or modifications may be made without departing from the scope of the present invention.

What is claimed is:

1. A media stream playback and buffer management system comprising:
    a server;
    a wireless router being connected with the server through a network cable;
    at least a media stream receiver being connected to the wireless router through a network cable, comprising a buffer, and configured to download media stream frames from the server at a time varying download rate (DR), to buffer the downloaded frames with the buffer, and to play the buffered content at a constant display frame rate (DFR); and
    at least a mobile terminal being configured to wirelessly communicate with the wireless router and remotely control the media stream receiver; wherein:
    the media stream receiver is configured to determine when to play or to buffer the downloaded content based on the download rate and the display frame rate;
    the download rate (DR) starts to increase from zero and by an equation DR=a×T before reaching the display frame rate (DFR), a being a slope constant, and T being time; and
    the media stream receiver is configured to start to play the buffered content when Ro×To/2 is equal to (DFR−Ro)×(Tmp−To)/2, Tmp being the time it takes for the DR to increase to DFR, To being the time when it is determined whether to play the buffered content, Ro being the DR corresponding to To.

2. The media stream playback and buffer management system of claim 1, wherein the media stream receiver comprises a central processing unit, a memory, a wireless communication module, a display, and a RF interface module, and the memory, the wireless communication module, the display, and the RF interface module are electrically connected with the central processing unit.

3. The media stream playback and buffer management system of claim 1, wherein the media stream receiver is configured to start to play the buffered content when the download rate is one half of the display frame rate, if the download rate eventually increases to be greater than the display frame rate.

4. The media stream playback and buffer management system of claim 1, wherein the media stream receiver is configured to start to play the buffered content when the download rate is equal to the display frame rate, if the download rate eventually increases to be equal to the display frame rate.

5. The media stream playback and buffer management system of claim 1, wherein the media stream receiver is configured to set a predetermined maximum download time and to start to play the buffered content from the predetermined maximum download time, if the download rate eventually increases to be less than the display frame rate.

6. The media stream playback and buffer management system of claim 1, wherein the media stream receiver is configured to play the buffered content and to store recently downloaded frames into the buffer, if the download rate is greater than or equal to the display frame rate.

7. The media stream playback and buffer management system of claim 6, wherein the media stream receiver is configured to check whether there is space available in the buffer to buffer more frames with, if the download rate is greater than the display frame rate.

8. The media stream playback and buffer management system of claim 1, wherein the media stream receiver is configured to play the buffered content when the number of frames stored in the buffer is greater than zero, if the download rate is less than the display frame rate.

9. The media stream playback and buffer management system of claim 8, wherein the media stream receiver is configured to stop playing the buffered content and to buffer recently downloaded frames, when the number of frames stored in the buffer is equal to zero.

10. The media stream playback and buffer management system of claim 9, wherein the media stream receiver is configured to resume playing the buffered content, when the number of frames stored in the buffer is greater than a predetermined threshold.

11. A method for media stream playback and buffer management comprising:
    downloading, by a media stream receiver, media stream frames at a time varying download rate (DR) from a server;
    buffering, by the media stream receiver, the downloaded frames with a buffer;
    playing, by the media stream receiver, the buffered content at a constant display frame rate (DFR); and
    determining, by the media stream receiver, when to play or to buffer the downloaded content based on the download rate and the display frame rate in real time; wherein
    the download rate (DR) starts to increase from zero and by an equation DR=a×T before reaching the display frame rate (DFR), a being a slope constant, and T being time; and the step of the determining comprises:
    starting to play, by the media stream receiver, the buffered content when Ro×To/2 is equal to (DFR−Ro)×(Tmp−To)/2, Tmp being the time it takes for the DR to increase to DFR, To being the time when it is determined whether to play the buffered content, Ro being the DR corresponding to To.

12. The method of claim 11 further comprising starting to play the buffered content when the download rate is one half of the display frame rate, if the download rate eventually increases to be greater than the display frame rate.

13. The method of claim 11 further comprising starting to play the buffered content when the download rate is equal to the display frame rate, if the download rate eventually increases to be equal to the display frame rate.

14. The method of claim 11 further comprising setting a predetermined maximum download time and starting to play the buffered content from the predetermined maximum download time, if the download rate eventually increases to be less than the display frame rate.

15. The method of claim 11 further comprising playing the buffered content and storing recently downloaded frames into the buffer, if the download rate is greater than or equal to the display frame rate.

16. The method of claim 15 further comprising checking whether there is space available in the buffer to buffer more frames with, if the download rate is greater than the display frame rate.

17. The method of claim 11 further comprising playing the buffered content when the number of frames stored in the buffer is greater than zero, if the download rate is less than the display frame rate.

18. The method of claim 17 further comprising stopping playing the buffered content and to buffer recently downloaded frames, when the number of frames stored in the buffer is equal to zero.

19. The method of claim 18 further comprising resuming playing the buffered content, when the number of frames stored in the buffer is greater than a predetermined threshold.

20. A media stream playback and buffer management system comprising:
  a server; and
  at least a media stream receiver being connected to the server, comprising a buffer, and configured to download media stream frames from the server at a time varying download rate, to buffer the downloaded frames with the buffer, and to play the buffered content at a constant display frame rate; wherein:
the media stream receiver is configured to determine when to play or to buffer the downloaded content based on the relationship between the download rate and the display frame rate in real time;
the download rate (DR) starts to increase from zero and by an equation $DR = a \times T$ before reaching the display frame rate (DFR), a being a slope constant, and T being time; and
the media stream receiver is configured to start to play the buffered content when $Ro \times To/2$ is equal to $(DFR-Ro) \times (Tmp-To)/2$, Tmp being the time it takes for the DR to increase to DFR, To being the time when it is determined whether to play the buffered content, Ro being the DR corresponding to To.

* * * * *